US012580959B2

(12) United States Patent
Southgate et al.

(10) Patent No.: US 12,580,959 B2
(45) Date of Patent: Mar. 17, 2026

(54) COUNTER ADVERSARY LARGE LANGUAGE MODELS

(71) Applicant: CrowdStrike, Inc., Sunnyvale, CA (US)

(72) Inventors: Andrew Southgate, Cambridge (GB); Paul Sumedrea, Bucharest (RO); Vasile-Daniel Sava, Vaslui (RO)

(73) Assignee: CrowdStrike, Inc., Sunnyvale, CA (US)

( * ) Notice: Subject to any disclaimer, the term of this patent is extended or adjusted under 35 U.S.C. 154(b) by 153 days.

(21) Appl. No.: 18/397,820

(22) Filed: Dec. 27, 2023

(65) Prior Publication Data

US 2025/0039234 A1 Jan. 30, 2025

Related U.S. Application Data

(60) Provisional application No. 63/511,560, filed on Jun. 30, 2023.

(51) Int. Cl.
*H04L 9/40* (2022.01)
(52) U.S. Cl.
CPC ...... *H04L 63/1483* (2013.01); *H04L 63/1416* (2013.01)
(58) Field of Classification Search
USPC .......................................................... 726/22
See application file for complete search history.

(56) References Cited

U.S. PATENT DOCUMENTS 10,880,322 B1 * 12/2020 Jakobsson ............... H04L 51/08
11,546,375 B2 * 1/2023 Kumar ................ H04L 63/1483

2017/0223034 A1 * 8/2017 Singh ................... H04L 63/1433
2019/0042738 A1 * 2/2019 Juliato ................... G06F 21/552
2021/0256117 A1 * 8/2021 Aharoni ................ G06F 21/554
2022/0094713 A1 * 3/2022 Lee ........................ G06F 18/214
2022/0217163 A1 * 7/2022 Frey .......................... G06N 3/09
2022/0278997 A1 * 9/2022 Jeyakumar ............ G06F 16/951
2023/0328088 A1 * 10/2023 Mehta ................... H04L 43/045
726/22

FOREIGN PATENT DOCUMENTS

AU 2019403265 B2 * 5/2023 .......... H04L 63/145

* cited by examiner

*Primary Examiner* — Sakinah White Taylor
(74) *Attorney, Agent, or Firm* — Womble Bond Dickinson (US) LLP

(57) ABSTRACT

A system and method of using generative AI to maintain conversations with attacking devices to discover their adversary techniques and tactics. The method includes receiving an initial message originating from an attacking device and directed to a target device. The method includes generating, using one or more classification models, a maliciousness score for the initial message indicating that the initial message is associated with one or more types of malicious activity. The method includes providing, by a processing device, the initial message to a predictive model trained to maintain conversations with attacking devices by predicting responses to malicious messages. The method includes generating, using the predictive model, two or more responses based on the initial message and at least one subsequent message, wherein each response of the two or more responses causes the attacking device to send a respective subsequent message to the predictive model.

20 Claims, 6 Drawing Sheets

300

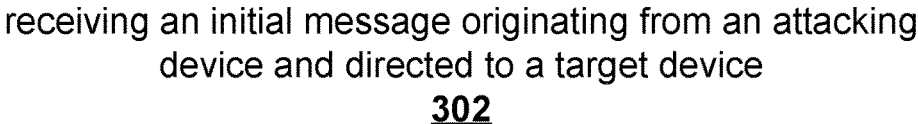

receiving an initial message originating from an attacking device and directed to a target device
302

↓ generating, using one or more classification models, a maliciousness score for the initial message indicating that the initial message is associated with one or more types of malicious activity
304

↓ providing, by a processing device, the initial message to a predictive model trained to maintain conversations with attacking devices by predicting responses to malicious messages
306

↓ generating, using the predictive model, two or more responses based on the initial message and at least one subsequent message, wherein each response of the two or more responses causes the attacking device to send a respective subsequent message to the predictive model
308

FIG. 3

COUNTER ADVERSARY LARGE LANGUAGE MODELS

CROSS-REFERENCE TO RELATED APPLICATIONS

This application claims the benefit of U.S. Provisional Application Ser. No. 63/511,560 entitled "COUNTER ADVERSARY LARGE LANGUAGE MODELS," filed Jun. 30, 2023, the disclosure of which is incorporated herein by reference in its entirety.

TECHNICAL FIELD

The present disclosure relates generally to cyber security, and more particularly, to systems and methods of using generative artificial intelligence (AI), such as Large Language Models (LLMs), to maintain conversations with malicious devices to discover their adversary techniques and/or tactics.

BACKGROUND

Cybersecurity is the practice of protecting critical systems and sensitive information from digital attacks. Cybersecurity techniques are designed to combat threats against networked systems and applications, whether those threats originate from inside or outside of an organization.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is a flow diagram depicting a method of using generative artificial intelligence to maintain conversations with malicious devices to discover their adversary techniques and tactics, according to some embodiments.

DETAILED DESCRIPTION

Figure 1A:
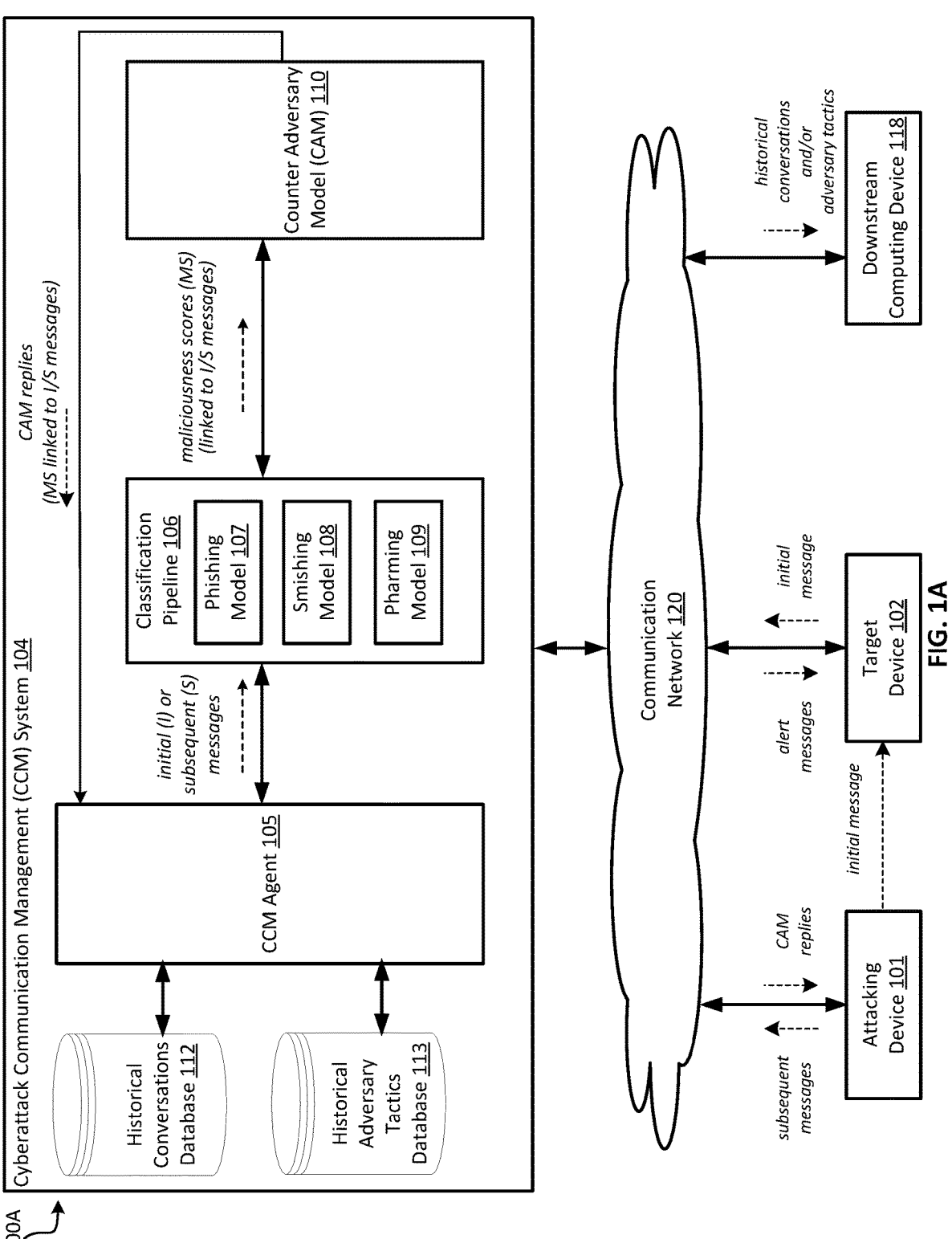
FIG. 1A is a block diagram depicting an example environment for using generative artificial intelligence to maintain conversations with malicious devices to discover their adversary techniques and tactics, according to some embodiments.

Users of computing devices (e.g., smartphones, laptops, desktops, and/or the like) often share sensitive information with their computing devices, and if a computing device is connected to a computing network (e.g., a private network, a public network, the Internet, and/or the like), then that sensitive information could also be shared with and/or exposed to the other computing devices that are also connected to the computing network. The sensitive information may include, for example, personal identifiable information (PII), financial information, health-related data, proprietary corporate information, and/or the like. Attackers seeking to exploit this sensitive information have devised mischievous ways (e.g., smishing, phishing, and/or pharming campaigns) to gain access to the sensitive information stored on these computing devices by using application programming interface (API) access or self-hosting techniques. The conventional solution to prevent an attacker (via an attacking/malicious device) from accessing the sensitive information has been to implement security guardrails within the computing devices and computing network. However, these guardrails have failed to completely stop attackers because they do not prevent a user from being tricked into divulging the sensitive information to the attacker.

Furthermore, there are inherent flaws in the conventional system that cause it to be more susceptible to malicious attacks, which in turn, could allow an attacker to steal sensitive data from the conventional system and/or excessively use the computing resources (e.g., memory resources, power resources, processing resources, networking resources) of the conventional system, the computing network that is coupled to the conventional system, and/or other computers that are on the same computing network as the conventional system. Thus, there is a long-felt but unsolved need to solve the problems of discovering the adversary techniques and tactics behind malicious attacks so to improve the ability for a computing system to detect and prevent the malicious attacks.

Aspects of the present disclosure address the above-noted and other deficiencies by using generative artificial intelligence (e.g., LLM, Recurrent Neural Network, text generating model based on diffusion techniques, a model with multimodal capacities–image+text) to maintain conversations with malicious devices to discover their adversary techniques and/or tactics of their malicious attacks. By providing a mechanism for the defending device to determine the extent of the malicious device's capabilities, the defending device is able to prevent currently existing types of attacks, as well as potentially new types of attacks. In addition, engaging with the attacker can disrupt their operations, making them focus their valuable resources (e.g., computing, memory, networking, and/or the like) into endless expensive conversations or even make them disclose important details about their past illegal actions and also share various means of contacting them which could help defenders get to the brains behind the operations.

In an illustrative embodiment, a cyberattack communication management (CCM) system receives an initial message originating from (e.g., sent from) an attacking device and intended for (e.g., directed to per a destination address) a target device. The CCM system provides the initial message to one or more classification models trained to generate maliciousness scores each indicating whether messages are associated with one or more types of malicious activity. The CCM system generates, using the one or more classification models, a maliciousness score for the initial message indicating that the initial message is associated with the one or more types of malicious activity. The CCM system provides the initial message to a predictive model trained to maintain conversations with attacking devices by predicting responses to malicious messages. The CCM system generates, using the predictive model, a plurality of responses based on the initial message and a plurality of subsequent messages. Each response of the plurality of responses causes the attacking device to send a respective subsequent message of the plurality of subsequent messages to the predictive model. Thus, the CCM system disrupts the attacker's operations, making the attacker focus the attacker's valuable resources (e.g., computing, memory, networking, and/or the like) into endless expensive conversations and/or make the attacker disclose important details about the attacker's past illegal actions.

FIG. 1A is a block diagram depicting an example environment for using generative artificial intelligence to maintain conversations with malicious devices to discover their adversary techniques and/or tactics, according to some embodiments. The environment 100A includes and/or executes a cyberattack communication management (CCM) system 104, an attacking device 101 (e.g., sometimes referred to as a malicious device), target device 102, and a downstream computing device 118 that are communicably coupled together via a communication network 120. The CCM system 104 includes and/or executes a CCM agent 105, a classification pipeline 106, and a counter adversary model (CAM) 110. In some embodiments, the predictive models of the classification pipeline 106 and/or the CAM 110 may be a large language model (LLM).

The classification pipelines 106 includes and/or executes a plurality of predictive models (e.g., large language models (LLMs)) for classifying a message. Specifically, the classification pipeline 106 includes a phishing model 107 that is trained, using a first set of training data, to generate a maliciousness score indicating a likelihood that a message (e.g., initial message, subsequent message) is associated with a first type of malicious activity corresponding to a phishing attack. The classification pipeline 106 also includes a smishing model 108 that is trained, using a second set of training data, to generate a maliciousness score indicating a likelihood that a message is associated with a second type of malicious activity corresponding to a smishing attack. The classification pipeline 106 also includes a pharming model 109 that is trained, using a third set of training data, to generate a maliciousness score indicating a likelihood that a message is associated with a third type of malicious activity corresponding to a pharming attack.

The CCM system 104 also includes a historical conversations database 112 that the CCM system 104 uses to store historical conversation associated with attacker devices (e.g., attacking device 101) and target devices (e.g., target device 102). The CCM system 104 also includes a historical adversary tactics database 113 that the CCM system 104 uses to store historical adversary tactics associated with the historical conversations.

The target device 102 may receive an initial message from the attacking device 101. The target device 102 may send a request to the CCM system 104 for information indicating whether the initial message is malicious or non-malicious, and where the request includes the initial message.

The CCM system 104 may provide the initial message to one or more of its predictive models to classify the initial message. For example, the CCM system 104 may use the phishing model 107 to generate a maliciousness score for the initial message indicating that the initial message is associated with a phishing attack, use the smishing model 108 to generate a maliciousness score for the initial message indicating that the initial message is associated with a smishing attack, and/or use the pharming model 109 to generate a maliciousness score for the initial message indicating that the initial message is associated with a pharming attack.

If the CCM system 104 determines that the initial message is associated with one or more of the several types of malicious activity (e.g., a phishing attack, a smishing attack, and/or pharming attack), then the CCM system 104 may send an alert message indicating that the initial message is associated with the one or more of the several types of malicious activity. A phishing attack may be, for example, when attackers attempt to trick users into doing the wrong thing, such as clicking a bad link that will download malware, or direct them to an untrustworthy (e.g., dodgy) website. A smishing attack may be, for example, when an attacker uses fake mobile text messages to trick people into downloading malware, sharing sensitive information, or sending money to cybercriminals. A pharming attack may be, for example, online fraud that involves the use of malicious code to direct victims to spoofed websites in an attempt to steal their credentials and data.

Furthermore, responsive to determining that the initial message is associated with one or more of the several types of malicious activity, the CCM system 104 may proceed to provide the initial message and its corresponding maliciousness score to the CAM 110, which is trained to maintain conversations with the attacking device 101 by predicting a response to the initial message, where the response is likely to cause the attacking device 101 to send a subsequent message that responds to the initial message. The CCM agent 105 then provides the subsequent message to one or more of its predictive models to classify the subsequent message and to generate a maliciousness score for the subsequent message. The CCM agent 105 repeats this process for each of the subsequent messages that the attacking device 101 sends to the CCM system 104.

Thus, the CAM 110 predicts a response to the initial message as well as responses to subsequent messages that are sent from attacking device 101 to the CCM system 104. For example, the CAM 110 may generate a plurality of responses based on the content of the initial message and the content of each of the subsequent messages. The CCM system 104 sends each of the responses of the plurality of responses to the attacking device 101, where each response causes the attacking device 101 to send a respective subsequent message of the plurality of subsequent messages to the CAM 110 of the CCM system 104 instead of the target device 102. For example, the CAM 110 may generate a first response to the initial message, a second response to a first subsequent message, a third response to a second subsequent message, and/or so on. The attacking device 101 sends, in chronological order, the initial message to the target device 102, the first second subsequent message to the CCM system 104, and the second subsequent message to the CCM system 104.

The CAM 110 may configure each of the responses of the plurality of responses to include information (e.g., header info) that tricks (e.g., spoofs) the attacking device 101 into believing that the plurality of responses are by the target device 102, even though they are sent by the CAM 110 of the CCM system 104. Thus, the CAM 110 is able to redirect a conversation that initially took place between the attacking device 101 and the target device 102 to instead take place between the attacking device 101 and the CAM 110 of the CCM system 104.

As discussed, the CAM 110 may generate the plurality of responses based on the content of the initial message and a plurality of subsequent messages. For example, the CAM 110 may generate a response based on the subject matter of the message (e.g., initial message, subsequent message). As another example, the CAM 110 may generate a response based on whether the content of the message includes scripts, a web address (e.g., Uniform Resource Locator (URL)), and/or web domains, etc.

The CCM system 104 may generate a conversation (sometimes referred to as conversation thread) that includes all the messages and responses (e.g., initial response, subsequent response) that took place between the attacking device 101, the target device 102, and the CCM system 104 during a particular conversation session (e.g., moment in time). The CCM system 104 stores the conversation in the historical conversations database 112. Thus, the CCM system 104 maintains, in the historical conversations database 112, a plurality of historical conversations, where each historical conversation includes a plurality of historical responses generated by the CAM 110 based on the plurality of malicious messages sent by the attacking device 101.

The CCM system 104 may identify a plurality of adversary tactics based on the plurality of historical conversations. In some embodiments, an adversary tactic may include information that is indicative of one or more historical illegal actions associated with the attacking device 101, contact information associated with the attacking device 101, personal identifying information associated with a user of the attacking device 101, and/or techniques/tactics employed by the attacking device 101 to extract private information from the target device 102.

The CCM system 104 may cause a message (e.g., initial message, subsequent message) to bypass the classification pipeline. For example, the CCM system 104 may receive a label and a message, wherein the label indicates that the message is associated with the one or more types of malicious activity. The CCM system 104 may determine, based on the label, that the message is associated with the one or more types of malicious activity. The CCM system 104 may prevent the predictive models (e.g., phishing model 107, smishing model 108, pharming model 109) of the classification pipeline 106 from receiving and ingesting the message. Instead, the CCM system 104 may provide the message and the label to the CAM 110 for processing.

The historical conversations database 112 and the historical adversary tactics database 113 may be used to improve a system's capability to detect and/or prevent malicious attacks. For example, the CCM system 104 may provide the plurality of adversary tactics and/or the plurality of historical conversations to a computing device to be used to train predictive models of the computing device to detect and/or prevent malicious attacks. As another example, the CCM system 104 may use the plurality of adversary tactics and/or the plurality of historical conversations to re-train its own models (e.g., classification pipeline 106) to improve their ability detect and/or prevent malicious attacks.

Still referring to FIG. 1A, the CCM system 104 receives an initial message originating from the attacking device 101 and intended for a target device 102. The CCM system 104 provides the initial message to one or more classification models (e.g., phishing model 107, smishing model 108, and/or pharming model 109) trained to generate maliciousness scores each indicating whether messages are associated with one or more types of malicious activity. The CCM system 104 generates, using the one or more classification models and responsive to generating the maliciousness score, a maliciousness score for the initial message indicating that the initial message is associated with the one or more types of malicious activity. The CCM system 104 provides the initial message to CAM 110 (e.g., a predictive model) trained to maintain conversations with attacking devices by predicting responses to malicious messages. The CCM system 104 generates, using the CAM 110, a plurality of responses based on the initial message and a plurality of subsequent messages. Each response of the plurality of responses causes the attacking device 101 to send a respective subsequent message of the plurality of subsequent messages to the CAM 110.

Although FIG. 1A shows only a select number of computing devices (e.g., CCM system 104, attacking device 101, target device 102, downstream computing device 118); the environment 100A may include any number of computing devices that are interconnected in any arrangement to facilitate the exchange of data between the computing devices.

Figure 1B:
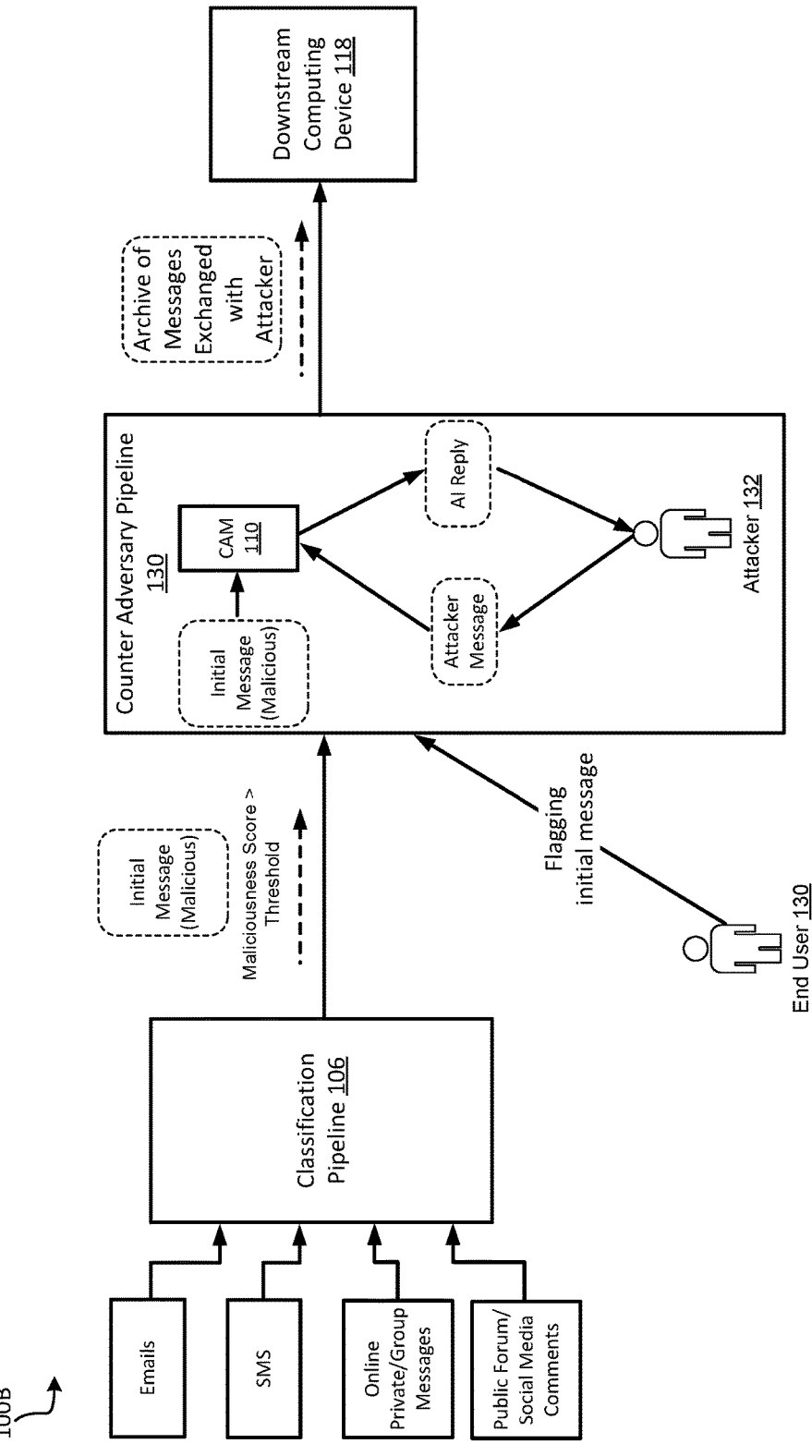
FIG. 1B is a block diagram depicting an example environment for using generative artificial intelligence to maintain conversations with malicious devices to discover their adversary techniques and tactics, according to some embodiments.

FIG. 1B is a block diagram depicting an example environment for using generative artificial intelligence to maintain conversations with malicious devices to discover their adversary techniques and tactics, according to some embodiments. Each of the components in FIG. 1B may be included in the CCM system 104 in FIG. 1A. The environment 100B includes the classification pipeline 106, a counter adversary pipeline 130, and the downstream computing device 118.

The classification pipeline 106 is configured to detect phishing attacks, smishing attacks, and pharming attacks from a message (e.g., initial message, subsequent message) sent by an attacker 132 by generating a maliciousness score indicating whether the message is associated with one or more types of malicious activity. The classification pipeline 106 is configured to send the message to the counter adversary pipeline 130 if the maliciousness score for the message exceeds a threshold value. The counter adversary pipeline 130 includes the CAM 110, which is configured to receive the message from the classification pipeline 106 and continue the conversation with the attacker 132 by generating AI replies based on the initial message and/or one or more attacker messages. The counter adversary pipeline 130 sends an archive of the message exchanges between the CAM 110 and the attacker 132 to a downstream computing device 118, which may be used for model training. By maintaining the conversation, the counter adversary pipeline 130 forces the attacker 132 to disclose their tactics, techniques, and procedures (TPPs).

Campaigns designed to steal credentials or trick users into downloading malicious software or accessing unreputable websites can be identified automatically using machine learning. During these campaigns the attackers include malicious URLs or malicious files which can be classified (by the CCM system 104) through various means such as deep learning-based classifiers (e.g., LLMs) or through other classical machine learning algorithms which are feature vector based. Moreover, the intent and general sentiment of these messages can be also classified by the CCM system 104. These messages present a sense of urgency and may include various persuasion techniques. For example, an attacker may design a message to induce fear or unrest to the end user 130 of the target device 102 such that they are compelled to act impulsively. Other techniques may exploit various personal details which could groom the end user 130 of the target device 102 into becoming an insider threat and leak proprietary information. All of these components can be considered as input to an ensemble of classifiers (of the CCM system 104) trained to detect such characteristics. The indication that a particular message is suspicious can also come from a human reporting a particular message as such even if the message had bypassed the initial automated filter described above.

After the CCM system 104 classifies the input as suspicious, it passes it to its generative model such as an LLM (or some other text generating model based on diffusion techniques or even a model with multimodal capacities–image+ text) which is designed to take this input as context and craft a convincing reply, initiating an endless back and forth conversation. All responses originating from this conversation thread can be stored and indexed in a database and classified in order to identify MITRE adversary tactics, techniques, and procedures (TTPs) from them and also searched for various clues which would help describe the attacker's operations (e.g., classifying additional domains included in the thread as being malicious). Using a model with conversational abilities which are obtained either via instruction tuning or some other policy optimization method learned as a reinforcement learning problem can make this agent convincing enough that it can engage the attacker long enough in order to tire and exhaust their operation centre (e.g., resources). In cases where the attacker is also an LLM-based system, techniques such as prompt injection can also be used to extract information or disrupt the attack.

Thus, the present disclosure describes a machine learning model which is trained on various conversations (e.g., such as e-mails, SMS, online private/group chat messages or conversations happening in forum threads). This model is Transformer-based, also called a Large Language Model, but the embodiments of the present disclosure could also be implemented using a Recurrent Neural Network (RNN) or a diffusion model for text generation among others.

The initial training maybe conducted by a computing device (e.g., CCM system 104 in FIG. 1A) in a self-supervised fashion, so at this first stage the computing device does not care about these messages being malicious or benign (e.g., they do not need to have any labels at this stage). The computing device provides the raw text to the model. Self-supervised training is a procedure in which one can employ a masking or a contrastive learning objective in order for the model to learn the semantics of the text (e.g., in natural language processing (NLP), a popular objective is Masked Language Modelling (MLM)).

After the self-supervised training (also called pre-training) is concluded the resulting model is fine-tuned using demonstrations. These demonstrations may come from a human and/or from another AI model, sometimes referred to as distilling knowledge from an AI model. This training is conducted in a supervised fashion where the model is fine-tuned using the following input/output pairs:

The input to the model is a clean or malicious message the computing device obtains from its corpus (e.g., from a dataset the computing device already has which is used to train a model which detects spam messages) and instructions. In some embodiments, the instructions may include one or more sentences describing what the model should generate with some additional context around the message. For example, it is known from the classification pipeline 106 that "we should generate a response for this phishing message which contains a malicious URL and a clean attachment and request more details to be provided about how to fill in details at the URL page we've been redirected to"). In some embodiments, the instructions could also include taking in a persona (e.g., "pretend you are an anxious citizen which is very stressed about their banking terms being suddenly changed").

The output of the model is a ground truth response which represents a demonstration of the desired text the computing device wants the ML model to generate. For example, a response to the message that was given as input to the model, where the message indicated a request for the aforementioned details and using the tone of an anxious citizen.

Here, the main goal during the supervised training process is to have the model learn to generate text which closely matches the ground-truth demonstration. This learning process can be seen as minimizing cross-entropy between our prediction and the ground-truth or as trying to maximize a score measuring the similarity between the predicted text and the ground-truth text (e.g., BiLingual Evaluation Understudy (BLEU) score, Recall-Oriented Understudy for Gisting Evaluation (ROUGE) score, Bidirectional Encoder Representations (BERT) score, etc.).

This self-supervised training step can either entail learning better weights across the entire network, or a computing device could conduct this training step through parameter efficient techniques (e.g., only training a few layers of the network called adapters and keeping the rest of the network frozen during supervised training; use prefix tuning/prompt tuning; use low rank adaptation). These parameter efficient techniques can be followed by a subsequent quantization step in which the computing device learns a small version of the model by learning an equivalent function with fewer parameters. Such a version is better suited for deployment (given that a small model is a faster model-because the computing device needs to compute fewer operations). Quantization represents a set of known mathematical transformations the computing device applies in order to make the model smaller, they do not need to be necessarily learned.

Alternatively, once the computing device has access to a pre-trained model (the one from step one for example, or another off the shelf model, be it commercially licensed or open source) the computing device could just use prompting instead of explicitly training the model to follow the instructions (e.g., explicitly training a model=learning new weights for the model). So prompting is a process in which the computing device achieves the end goal without explicitly modifying the model weights in the process. This is possible because text generation models assign a probability to each next token (e.g., word) in a sequence while they sequentially generate an output. Each new token is conditioned by the one which came before it (and these probabilities have been learned through self-supervision). Giving a particular input (e.g., a prompt) to the network can force the model to generate the desired output, given this output is very likely to be generated due to the probabilities for each token in the sequence the model already learned during self-supervision.

Figures 2A, 2B:
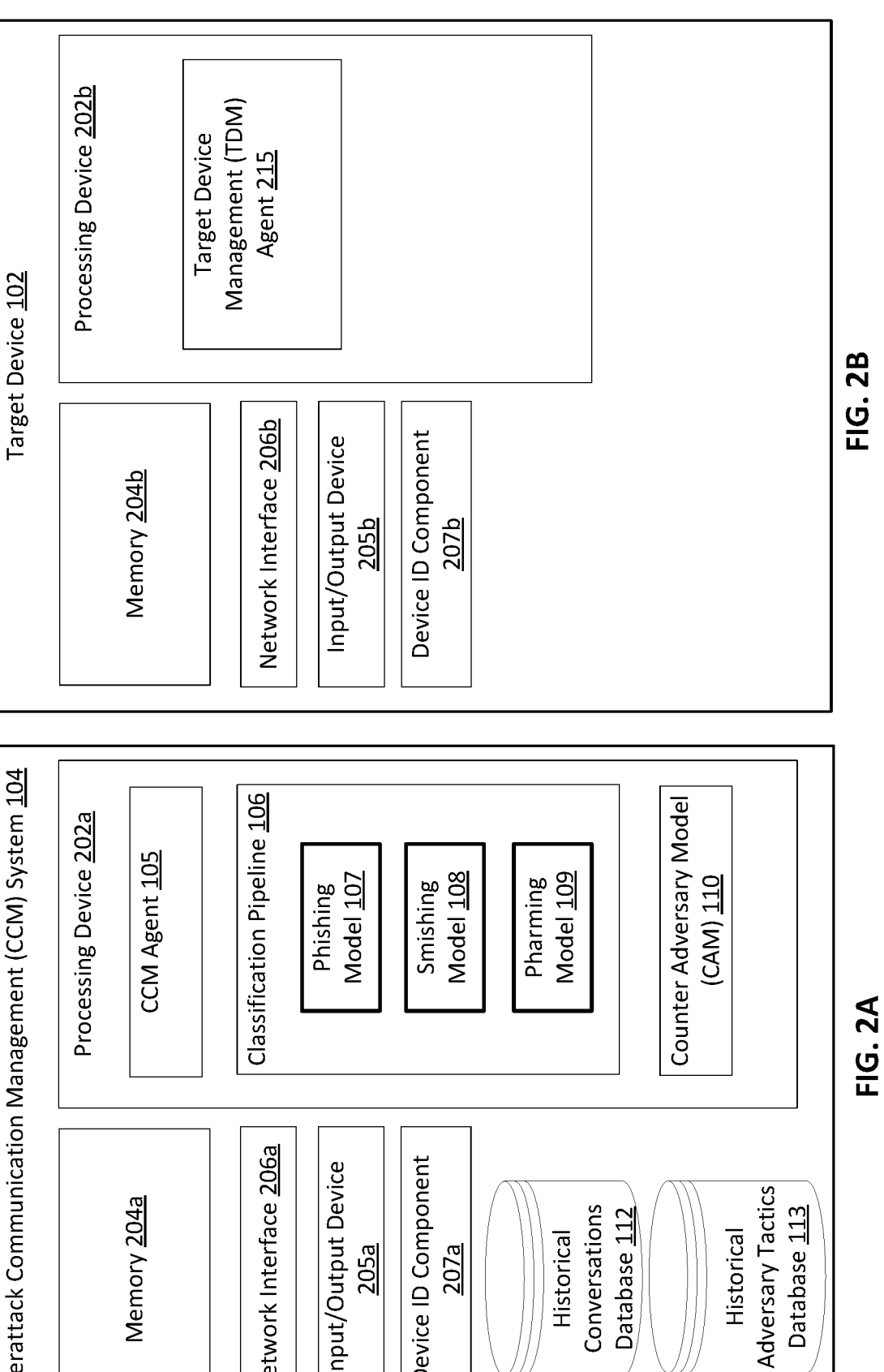
FIG. 2A is a block diagram depicting an example of the cyberattack communication management (CCM) system in FIG. 1, according to some embodiments.
FIG. 2B is a block diagram depicting an example of the target device 102 in FIG. 1, according to some embodiments.

FIG. 2A is a block diagram depicting an example of the cyberattack communication management (CCM) system in FIG. 1, according to some embodiments. While various devices, interfaces, and logic with particular functionality are shown, it should be understood that the CCM system 104 includes any number of devices and/or components, interfaces, and logic for facilitating the functions described herein. For example, the activities of multiple devices may be combined as a single device and implemented on the same processing device (e.g., processing device 202a), as additional devices and/or components with additional functionality are included.

The CCM system 104 includes a processing device 202a (e.g., general purpose processor, a PLD, etc.), which may be composed of one or more processors, and a memory 204a (e.g., communicate with each other via a bus (not shown).

The processing device 202a may be provided by one or more general-purpose processing devices such as a microprocessor, central processing unit, graphic processing unit (GPU), or the like. In some embodiments, processing device 202*a* may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202*a* may include one or more special-purpose processing devices such as an application specific integrated circuit (ASIC), a field programmable gate array (FPGA), a digital signal processor (DSP), network processor, or the like. The processing device 202*a* may be configured to execute the operations described herein, in accordance with one or more aspects of the present disclosure, for performing the operations and steps discussed herein.

The memory 204*a* (e.g., Random Access Memory (RAM), Read-Only Memory (ROM), Non-volatile RAM (NVRAM), Flash Memory, hard disk storage, optical media, etc.) of processing device 202*a* stores data and/or computer instructions/code for facilitating at least some of the various processes described herein. The memory 204*a* includes tangible, non-transient volatile memory, or non-volatile memory. The memory 204*a* stores programming logic (e.g., instructions/code) that, when executed by the processing device 202*a*, controls the operations of the CCM system 104. In some embodiments, the processing device 202*a* and the memory 204*a* form various processing devices and/or circuits described with respect to the CCM system 104. The instructions include code from any suitable computer programming language such as, but not limited to, C, C++, C#, Java, JavaScript, VBScript, Perl, HTML, XML, Python, TCL, and Basic.

The processing device 202*a* executes a CCM agent 105, a classification pipeline 106, and a counter adversary model (CAM) 110. The classification pipeline 106 includes a phishing model 107, a smishing model 108, and a pharming model 109. The CCM system 104 includes a historical conversations database 112 and a historical adversary tactics database 113. In some embodiments, any of the CCM agent 105, the classification pipeline 106 (including one or more of its models), and the CAM 110 may be combined into a single entity that includes all the functions and features of its individual parts.

The CCM agent 105 may be configured to receive an initial message originating from the attacking device 101 and intended for the target device 102. In some embodiments, the initial message may be the first message that an attacking device 101 sends to a target device 102 in a particular communication session or the initial message may be any number of messages that the attacking device 101 sends to the target device 102 during the particular communication session and after the first message. The CCM agent 105 may be configured to provide the initial message to one or more classification models (e.g., phishing model 107, smishing model 108, pharming model 109) of the classification pipeline 106, where each classification model is trained to generate one or more maliciousness scores each indicating whether messages (e.g., initial message, subsequent messages, etc.) are associated with one or more types of malicious activity. The one or more types of malicious activity may include at least one of a phishing attack, a smishing attack, or a pharming attack.

The CCM agent 105 may be configured to generate, using the one or more classification models, a maliciousness score for the initial message indicating that the initial message is associated with the one or more types of malicious activity. The CCM agent 105 may be configured to provide the initial message to the CAM 110, which is a predictive model that is trained to maintain conversations with attacking devices 101 by predicting responses to malicious messages. The CCM agent 105 may be configured to generate, using the CAM 110, a plurality of responses based on the initial message and a plurality of subsequent messages. Each response of the plurality of responses causes the attacking device 101 to send a respective subsequent message of the plurality of subsequent messages to the CAM 110.

In some embodiments, at least the initial message or one or more subsequent messages of the plurality of subsequent messages includes at least one of a malicious file, a malicious web address, or a query seeking sensitive information associated with a user of the target device 102.

In some embodiments, any of the models (e.g., phishing model 107, smishing model 108, pharming model 109, and CAM 110) may be any type of generative artificial intelligence (e.g., an LLM, Recurrent Neural Network, text generating model based on diffusion techniques, a model with multimodal capacities–image+text).

The CCM agent 105 may be configured to receive a label and a malicious message, wherein the label indicates that the malicious message is associated with the one or more types of malicious activity. The CCM agent 105 may be configured to determine, based on the label, that the malicious message is associated with the one or more types of malicious activity. The CCM agent 105 may be configured to prevent the one or more classification models from receiving the malicious message responsive to determining that the malicious message is associated with the one or more types of malicious activity. The CCM agent 105 may be configured to provide the malicious message to the CAM 110.

The CCM agent 105 may be configured to maintain, in the historical conversations database 112, a plurality of historical conversations. Each historical conversation includes a plurality of historical responses that are generated by the CAM 110 based on a plurality of malicious messages. The CCM agent 105 may be configured to identify a plurality of adversary tactics based on the plurality of historical conversations. In some embodiments, the plurality of historical conversations do not explicitly state the type of adversary tactic that is being used/applied by an attacking device 101 during the historical conversation. In some embodiments, an adversary tactic may correspond to MITRE ATT&CK, which is a globally-accessible knowledge base of adversary tactics and techniques that are based on real-world observations.

The plurality of adversary tactics include information indicative of at least one or more of one or more historical illegal actions associated with the attacking device 101; contact information associated with the attacking device 101; or personal identifying information associated with a user of the attacking device 101.

The CCM agent 105 may be configured to provide at least one of the plurality of adversary tactics or the plurality of historical conversations to a computing device (e.g., downstream computing device 118) to be used to train another predictive model to prevent malicious attacks. The CCM agent 105 may be configured to re-train (e.g., refine), using at least one of the plurality of adversary tactics or the plurality of historical conversations, the one or more classification models to improve an ability of the one or more classification models to detect the one or more types of malicious activity.

The CCM system 104 includes a network interface 206*a* configured to establish a communication session with a computing device for sending and receiving data over the communication network 120 to the computing device.

Accordingly, the network interface 206*a* includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the CCM system 104 includes a plurality of network interfaces 206*a* of different types, allowing for connections to a variety of networks, such as local area networks (public or private) or wide area networks including the Internet, via different sub-networks.

The CCM system 104 includes an input/output device 205*a* configured to receive user input from and provide information to a user. In this regard, the input/output device 205*a* is structured to exchange data, communications, instructions, etc. with an input/output component of the CCM system 104. Accordingly, input/output device 205*a* may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the CCM system 104, such as a built-in display, touch screen, microphone, etc., or external to the housing of the CCM system 104, such as a monitor connected to the CCM system 104, a speaker connected to the CCM system 104, etc., according to various embodiments. In some embodiments, the CCM system 104 includes communication circuitry for facilitating the exchange of data, values, messages, and the like between the input/output device 205*a* and the components of the CCM system 104. In some embodiments, the input/output device 205*a* includes machine-readable media for facilitating the exchange of information between the input/output device 205*a* and the components of the CCM system 104. In still another embodiment, the input/output device 205*a* includes any combination of hardware components (e.g., a touchscreen), communication circuitry, and machine-readable media.

The CCM system 104 includes a device identification component 207*a* (shown in FIG. 2A as device ID component 207*a*) configured to generate and/or manage a device identifier associated with the CCM system 104. The device identifier may include any type and form of identification used to distinguish the CCM system 104 from other computing devices. In some embodiments, to preserve privacy, the device identifier may be cryptographically generated, encrypted, or otherwise obfuscated by any device and/or component of the CCM system 104. In some embodiments, the CCM system 104 may include the device identifier in any communication (e.g., classifier performance data, input message, parameter message, etc.) that the CCM system 104 sends to a computing device.

The CCM system 104 includes a bus (not shown), such as an address/data bus or other communication mechanism for communicating information, which interconnects the devices and/or components of the CCM system 104, such as processing device 202*a*, network interface 206*a*, input/output device 205*a*, and device ID component 207*a*.

In some embodiments, some or all of the devices and/or components of CCM system 104 may be implemented with the processing device 202*a*. For example, the CCM system 104 may be implemented as a software application stored within the memory 204*a* and executed by the processing device 202*a*. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the target device 102 in FIG. 1, according to some embodiments. While various devices, interfaces, and logic with particular functionality are shown, it should be understood that the target device 102 includes any number of devices and/or components, interfaces, and logic for facilitating the functions described herein. For example, the activities of multiple devices may be combined as a single device and implemented on a same processing device (e.g., processing device 202*b*), as additional devices and/or components with additional functionality are included.

The target device 102 includes a processing device 202*b* (e.g., general purpose processor, a PLD, etc.), which may be composed of one or more processors, and a memory 204*b* (e.g., communicate with each other via a bus (not shown). The processing device 202*b* includes identical or nearly identical functionality as processing device 202*a* in FIG. 2A, but with respect to devices and/or components of the target device 102 instead of devices and/or components of the CCM system 104.

The memory 204*b* of processing device 202*b* stores data and/or computer instructions/code for facilitating at least some of the various processes described herein. The memory 204*b* includes identical or nearly identical functionality as memory 204*a* in FIG. 2A, but with respect to devices and/or components of the target device 102 instead of devices and/or components of the CCM system 104.

The processing device 202*b* executes a target device management (TDM) agent 215 that may be configured to establish a communication session with an attacking device 101. The TDM agent 215 may be configured to receive, during the communication session, an initial message from the attacking device 101. The TDM agent 215 may send a request to the CCM system 104 for the CCM system 104 to determine whether the initial message is associated with one or more of the several types of malicious activity (e.g., a phishing attack, a smishing attack, and/or pharming attack). In response, the TDM agent 215 may receive an alert message from the CCM system 104, where the alert message indicates whether the initial message is associated with the one or more of the several types of malicious activity.

The target device 102 includes a network interface 206*b* configured to establish a communication session with a computing device for sending and receiving data over a network to the computing device. Accordingly, the network interface 206*b* includes identical or nearly identical functionality as network interface 206*a* in FIG. 2A, but with respect to devices and/or components of the target device 102 instead of devices and/or components of the CCM system 104.

The target device 102 includes an input/output device 205*b* configured to receive user input from and provide information to a user. In this regard, the input/output device 205*b* is structured to exchange data, communications, instructions, etc. with an input/output component of the target device 102. The input/output device 205*b* includes identical or nearly identical functionality as input/output device 205*a* in FIG. 2A, but with respect to devices and/or components of the target device 102 instead of devices and/or components of the CCM system 104.

The target device 102 includes a device identification component 207*b* (shown in FIG. 2B as device ID component 207*b*) configured to generate and/or manage a device identifier associated with the target device 102. The device ID component 207*b* includes identical or nearly identical functionality as device ID component 207*a* in FIG. 2A, but with respect to devices and/or components of the target device 102 instead of devices and/or components of the CCM system 104.

The target device 102 includes a bus (not shown), such as an address/data bus or other communication mechanism for communicating information, which interconnects the devices and/or components of the target device 102, such as processing device 202*b*, network interface 206*b*, input/output device 205*b*, and device ID component 207*b*.

In some embodiments, some or all of the devices and/or components of the target device 102 may be implemented with the processing device 202*b*. For example, the target device 102 may be implemented as a software application stored within the memory 204*b* and executed by the processing device 202*b*. Accordingly, such an embodiment can be implemented with minimal or no additional hardware costs. In some embodiments, any of these above-recited devices and/or components rely on dedicated hardware specifically configured for performing operations of the devices and/or components.

Figure 2C:
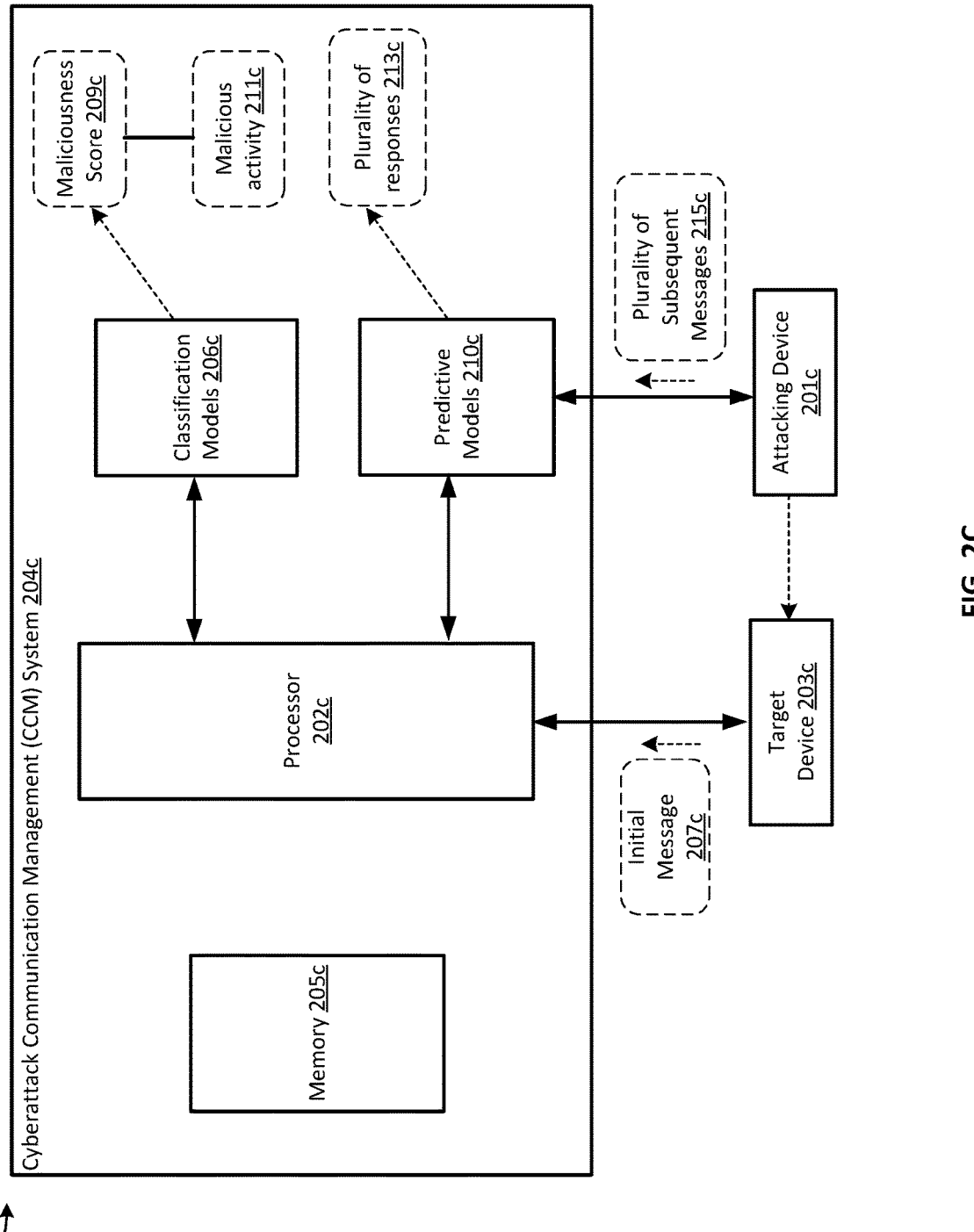
FIG. 2C is a block diagram depicting an example environment for using a CCM system, according to some embodiments.

FIG. 2C is a block diagram depicting an example environment for using a CCM system, according to some embodiments. The environment 200*c* includes a CCM system 204*c*, such as CCM system 104 in FIG. 1. The CCM system 204*c* includes a memory 205*c* and a processing device 202*c* that is operatively coupled to the memory 205*c*. The processing device 202*c* receives an initial message 207*c* originating from an attacking device 201*c* and intended for a target device 203*c*. The processing device 202*c* provides the initial message 207*c* to one or more classification models 206*c* trained to generate maliciousness scores each indicating whether messages are associated with one or more types of malicious activity. The processing device 302*c* generates, using the one or more classification models 206*c*, a maliciousness score 209*c* for the initial message 207*c* indicating that the initial message 207*c* is associated with the one or more types of malicious activity 211*c*. The processing device 202*c* provides, responsive to generating the maliciousness score, the initial message 207*c* to a predictive model 210*c* trained to maintain conversations with attacking devices by predicting responses to malicious messages. The processing device 202*c* generates, using the predictive model 210*c*, a plurality of responses 213*c* based on the initial message 207*c* and a plurality of subsequent messages 215*c*. Each response of the plurality of responses 213*c* causes the attacking device 201*c* to send a respective subsequent message of the plurality of subsequent messages to the predictive model.

FIG. 3 is a flow diagram depicting a method of using generative artificial intelligence to maintain conversations with malicious devices to discover their adversary techniques and tactics, according to some embodiments. Method 300 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 300 may be performed by a cyberattack communication management (CCM) system, such as the CCM system 104 in FIG. 1A.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of receiving an initial message originating from an attacking device and directed to a target device. The method 300 includes the block 304 of generating, using one or more classification models, a maliciousness score for the initial message indicating that the initial message is associated with one or more types of malicious activity. The method 300 includes the block 306 of providing, by a processing device, the initial message to a predictive model trained to maintain conversations with attacking devices by predicting responses to malicious messages. The method 300 includes the block 308 of generating, using the predictive model, two or more responses based on the initial message and at least one subsequent message, wherein each response of the two or more responses causes the attacking device to send a respective subsequent message to the predictive model. Thus, a computing device may implement method 300 to disrupt the attacker's operations by making the attacker focus the attacker's valuable resources (e.g., computing, memory, networking, and/or the like) into endless expensive conversations and/or make the attacker disclose important details about the attacker's past illegal actions.

Figure 4:
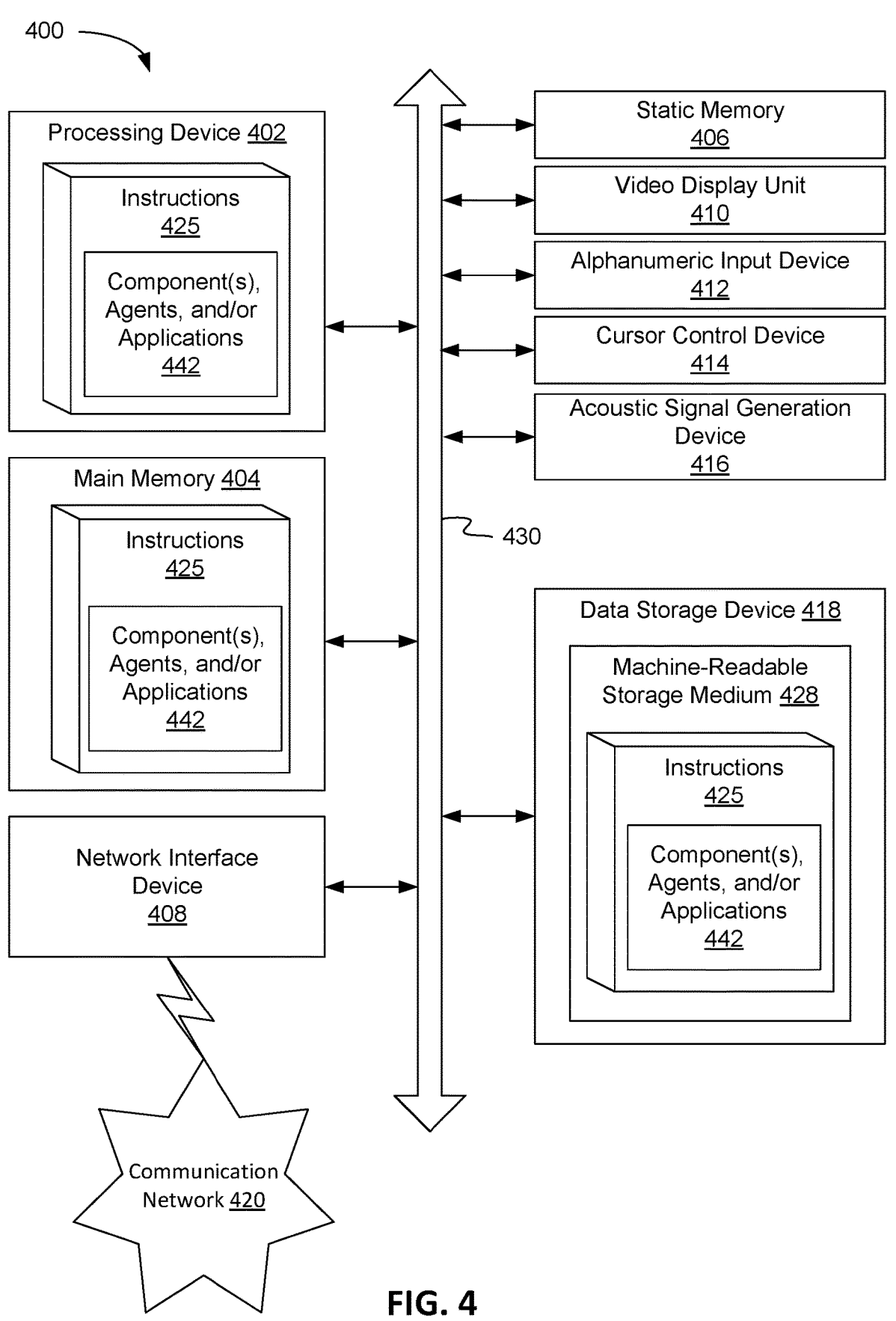
FIG. 4 is a block diagram of an example computing device 400 that may perform one or more of the operations described herein, in accordance with some embodiments.

FIG. 4 is a block diagram of an example computing device 400 that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random-access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also include one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components/programs/applications 442 (e.g., CCM agent 105, classification pipeline 106, phishing model 107, smishing model 108, pharming model 109, CAM 110 in FIG. 1A, etc.) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "maintaining," "identifying," "selecting," "generating," "providing," "training," "retraining," "preventing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112 (f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:
receiving an initial message originating from an attacking device and directed to a target device;
generating, using one or more classification models, a maliciousness score for the initial message indicating that the initial message is associated with one or more types of malicious activity;
providing, by a processing device, the initial message to a predictive model trained to maintain conversations with attacking devices by predicting responses to malicious messages; and
generating, using the predictive model based on the initial message and at least one subsequent message, two or more responses based on the initial message and at least one subsequent message, wherein each response of the two or more responses causes the attacking device to send a respective subsequent message to the predictive model,
wherein the predictive model generates the two or more responses with header information that identifies the target device as the sender to impersonate the target device; and wherein the two or more responses include content configured to request clarifications or instructions from the attacking device to elicit information indicative of adversary tactics, techniques, or procedures (TTPs).

2. The method of claim 1, wherein the one or more types of malicious activity comprises at least one of a phishing attack, a smishing attack, or a pharming attack.

3. The method of claim 2, wherein the one or more classification models comprises a plurality of classifications models each uniquely trained to detect a respective type of malicious activity of the one or more types of malicious activity.

4. The method of claim 1, wherein at least the initial message or the at least one subsequent message comprises at least one of:
a malicious file,
a malicious web address, or
a query seeking sensitive information associated with a user of the target device.

5. The method of claim 1, wherein at least one of the predictive model or each classification model of the one or more classification models correspond to a large language model (LLM).

6. The method of claim 1, further comprising:
receiving a label and a malicious message, wherein the label indicates that the malicious message is associated with the one or more types of malicious activity;
determining, based on the label, that the malicious message is associated with the one or more types of malicious activity;
preventing the one or more classification models from receiving the malicious message responsive to determining that the malicious message is associated with the one or more types of malicious activity; and
providing the malicious message to the predictive model.

7. The method of claim 1, further comprising:
maintaining, in a database, a plurality of historical conversations, each historical conversation comprising a plurality of historical responses generated by the predictive model based on a plurality of malicious messages; and
identifying a plurality of adversary tactics based on the plurality of historical conversations.

8. The method of claim 7, wherein the plurality of adversary tactics comprises information indicative of at least one or more of:
one or more historical illegal actions associated with the attacking device;
contact information associated with the attacking device; or
personal identifying information associated with a user of the attacking device.

9. The method of claim 7, further comprising:
providing at least one of the plurality of adversary tactics or the plurality of historical conversations to a computing device to be used to train another predictive model to prevent malicious attacks.

10. The method of claim 7, further comprising:
re-training, using at least one of the plurality of adversary tactics or the plurality of historical conversations, the one or more classification models to improve an ability of the one or more classification models to detect the one or more types of malicious activity.

11. A system comprising:
a memory; and
a processing device, operatively coupled to the memory, to:
receive an initial message originating from an attacking device and directed to a target device;
generate, using one or more classification models, a maliciousness score for the initial message indicating that the initial message is associated with one or more types of malicious activity;
provide the initial message to a predictive model trained to maintain conversations with attacking devices by predicting responses to malicious messages; and
generate, using the predictive model, two or more responses based on the initial message and at least one subsequent message, wherein each response of the two or more responses causes the attacking device to send a respective subsequent message to the predictive model,
wherein the predictive model generates the two or more responses with header information that identifies the target device as the sender to impersonate the target device; and wherein the two or more responses include content configured to request clarifications or instructions from the attacking device to elicit information indicative of adversary tactics, techniques, or procedures (TTPs).

12. The system of claim 11, wherein the one or more types of malicious activity comprises at least one of a phishing attack, a smishing attack, or a pharming attack.

13. The system of claim 12, wherein the one or more classification models comprises a plurality of classifications models each uniquely trained to detect a respective type of malicious activity of the one or more types of malicious activity.

14. The system of claim 11, wherein at least the initial message or the at least one subsequent message comprises at least one of:
   a malicious file,
   a malicious web address, or
   a query seeking sensitive information associated with a user of the target device.

15. The system of claim 11, wherein at least one of the predictive model or each classification model of the one or more classification models correspond to a large language model (LLM).

16. The system of claim 11, wherein the processing device is further to:
   receive a label and a malicious message, wherein the label indicates that the malicious message is associated with the one or more types of malicious activity;
   determine, based on the label, that the malicious message is associated with the one or more types of malicious activity;
   prevent the one or more classification models from receiving the malicious message responsive to determining that the malicious message is associated with the one or more types of malicious activity; and
   provide the malicious message to the predictive model.

17. The system of claim 11, wherein the processing device is further to:
   maintaining, in a database, a plurality of historical conversations, each historical conversation comprising a plurality of historical responses generated by the predictive model based on a plurality of malicious messages; and
   identifying a plurality of adversary tactics based on the plurality of historical conversations.

18. The system of claim 17, wherein the plurality of adversary tactics comprises information indicative of at least one or more of:
   one or more historical illegal actions associated with the attacking device;
   contact information associated with the attacking device; or
   personal identifying information associated with a user of the attacking device.

19. The system of claim 17, wherein the processing device is further to at least one of:
   provide at least one of the plurality of adversary tactics or the plurality of historical conversations to a computing device to be used to train another predictive model to prevent malicious attacks, or
   re-train, using at least one of the plurality of adversary tactics or the plurality of historical conversations, the one or more classification models to improve an ability of the one or more classification models to detect the one or more types of malicious activity.

20. A non-transitory computer-readable medium storing instructions that, when execute by a processing device, cause the processing device to:
   receive an initial message originating from an attacking device and directed to a target device;
   generate, using one or more classification models, a maliciousness score for the initial message indicating that the initial message is associated with one or more types of malicious activity;
   provide, by the processing device, the initial message to a predictive model trained to maintain conversations with attacking devices by predicting responses to malicious messages; and
   generate, using the predictive model, two or more responses based on the initial message and at least one subsequent message, wherein each response of the two or more responses causes the attacking device to send a respective subsequent message to the predictive model,
   wherein the predictive model generates the two or more responses with header information that identifies the target device as the sender to impersonate the target device; and wherein the two or more responses include content configured to request clarifications or instructions from the attacking device to elicit information indicative of adversary tactics, techniques, or procedures (TTPs).

* * * * *